(12) United States Patent
Ianev et al.

(10) Patent No.: US 11,576,106 B2
(45) Date of Patent: Feb. 7, 2023

(54) SERVICE TYPES AND CONGESTION CONTROL

(71) Applicant: NEC Laboratories Europe GmbH, Heidelberg (DE)

(72) Inventors: Iskren Ianev, Lower Earley (GB); Linghang Fan, Woking (GB); Sivasubramaniam Ramanan, Middx (GB); Hassan Al-Kanani, Iver (GB)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 17/059,497

(22) PCT Filed: May 31, 2019

(86) PCT No.: PCT/EP2019/064237
§ 371 (c)(1),
(2) Date: Nov. 30, 2020

(87) PCT Pub. No.: WO2019/229263
PCT Pub. Date: Dec. 5, 2019

(65) Prior Publication Data
US 2021/0136659 A1    May 6, 2021

(30) Foreign Application Priority Data
Jun. 1, 2018  (EP) .................... 18175586

(51) Int. Cl.
*H04W 48/06* (2009.01)
*H04W 48/14* (2009.01)
(52) U.S. Cl.
CPC ........... *H04W 48/06* (2013.01); *H04W 48/14* (2013.01)

(58) Field of Classification Search
None
See application file for complete search history.

(56) References Cited

U.S. PATENT DOCUMENTS

2015/0249900 A1 * 9/2015 Kim ...................... H04W 24/10
                                                                370/252
2019/0253917 A1 * 8/2019 Dao .................. H04W 28/0268

FOREIGN PATENT DOCUMENTS

EP         3355644 A1 *  8/2018  ........ H04W 28/0268
EP         3413628 B1 * 10/2020  ............ H04W 48/02
(Continued)

OTHER PUBLICATIONS

"3rd Generation Partnership Project; Technical Specification Group Core Network and Terminals; Non-Access-Stratum (NAS) protocol for 5G System (5GS); Stage 3 (Release 15)", 3GPP Standard; Technical Specification; 3GPP TS 24.501, 3rd Generation Partnership Project (3GPP), Mobile Competence Centre; 650, Route Des Lucioles; F-06921 Sophia-Antipolis Cedex; France, vol. CT WG1, No. V1.1.0, May 9, 2018 (May 9, 2018), pp. 1-305, XP051451332.
(Continued)

*Primary Examiner* — Hong S Cho
(74) *Attorney, Agent, or Firm* — Leydig, Voit & Mayer, Ltd.

(57) ABSTRACT

A method performed by a network node includes receiving a service request for requesting a communication for a user equipment (UE). The service request includes information identifying a service type associated with the requested communication. It is determined whether to reject the service request based on the service type associated with the requested communication.

23 Claims, 10 Drawing Sheets

(56) References Cited

FOREIGN PATENT DOCUMENTS

WO    WO 2017/140387 A1    8/2017
WO    WO 2018/070172 A1    4/2018

OTHER PUBLICATIONS

Vodafone: "Low access priority indication for the service request procedure in EPS", 3GPP Draft; C1-110919-Low-Priority-Disc, 3rd Generation Partnership Project (3GPP), Mobile Competence Centre; 650, Route Des 6,12 Lucioles; F-06921 Sophia-Antipolis Cedex; France, vol. CT WG1, no. Salt Lake City; Feb. 21, 2011, Feb. 12, 2011 (Feb. 12, 2011), XP050480285.

* cited by examiner

| Service type value (octet 1) |
|---|
| Bits<br>3 2 1<br>0 0 0    signalling<br>0 0 1    data<br>0 1 0    mobile terminated services<br>0 1 1    emergency services<br>1 0 0    emergency services fallback<br>1 0 1    high priority access<br>1 1 0    new service type |
| All other values are reserved. |

Figure 5

SERVICE TYPES AND CONGESTION CONTROL

CROSS-REFERENCE TO PRIOR APPLICATIONS

This application is a U.S. National Phase Application under 35 U.S.C. § 371 of International Application No. PCT/EP2019/064237, filed on May 31, 2019, and claims benefit to European Patent Application No. EP 18175586.9, filed on Jun. 1, 2018. The International Application was published in English on Dec. 5, 2019, as WO 2019/229263 under PCT Article 21(2).

FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to congestion control in the so-called '5G' (or 'Next Generation') systems.

BACKGROUND

There are numerous studies ongoing in 3GPP where the 3GPP working groups study how to optimise the 3GPP networks for the new services to be deployed by 5G (and also 4G) mobile networks. New network operations requirements will address the necessary control and data plane resource efficiencies, as well as network configurations that optimise service delivery by minimising routing and load between end users and application servers. Support for Massive Internet of Things (MIoT) brings many new requirements. The expansion of connected things introduces a need for significant improvements in resource efficiency in all system components (e.g., UEs, IoT devices, radio, access network, core network). Unlike previous 3GPP systems that attempted to provide a 'one size fits all' system, the 5G system is expected to be able to provide optimised support for a variety of different services, different traffic loads, and different end user communities.

3GPP SA1 working group continues its work on new services definitions for future mobile networks in Technical Specification (TS) 22.261 V16.3.0. This technology revolution is achievable with the introduction of new technologies, both in access and the core, such as flexible, scalable assignment of network resources. In addition to increased flexibility and optimisation, a 5G system needs to support stringent KPIs for latency, reliability, throughput, etc.

3GPP SA2 working group is working on the CIoT for 5G study (Technical Report (TR) 23.724 V0.3.0) for architecture enhancements to enable CIoT/MTC functionalities in 5G CN and to address related service requirements defined in TS 23.261 V14.0.0 and RAN requirements in TR 38.913 V14.3.0 and how to enable them in 5G CN. One of the key areas of study is how to optimise the 3GPP network for delay tolerant UEs and applications.

3GPP SA2 working group is also working on Network Data Analytics Function (NWDAF) study (TR 23.791 V0.3.0) for data collection and data analytics in centralised manner. An NWDAF may be used for analytics for one or more Network Slice(s). 5GS Network Functions decide how to use the data analytics provided by NWDAF to improve the network performance.

SUMMARY

In an embodiment, the present invention provides a method performed by a network node which includes receiving a service request for requesting a communication for a user equipment (UE). The service request includes information identifying a service type associated with the requested communication. It is determined whether to reject the service request based on the service type associated with the requested communication.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 5 illustrates schematically an exemplary way in which a new service type may be added in the system shown in FIG. 1.

DETAILED DESCRIPTION

Figure 1:
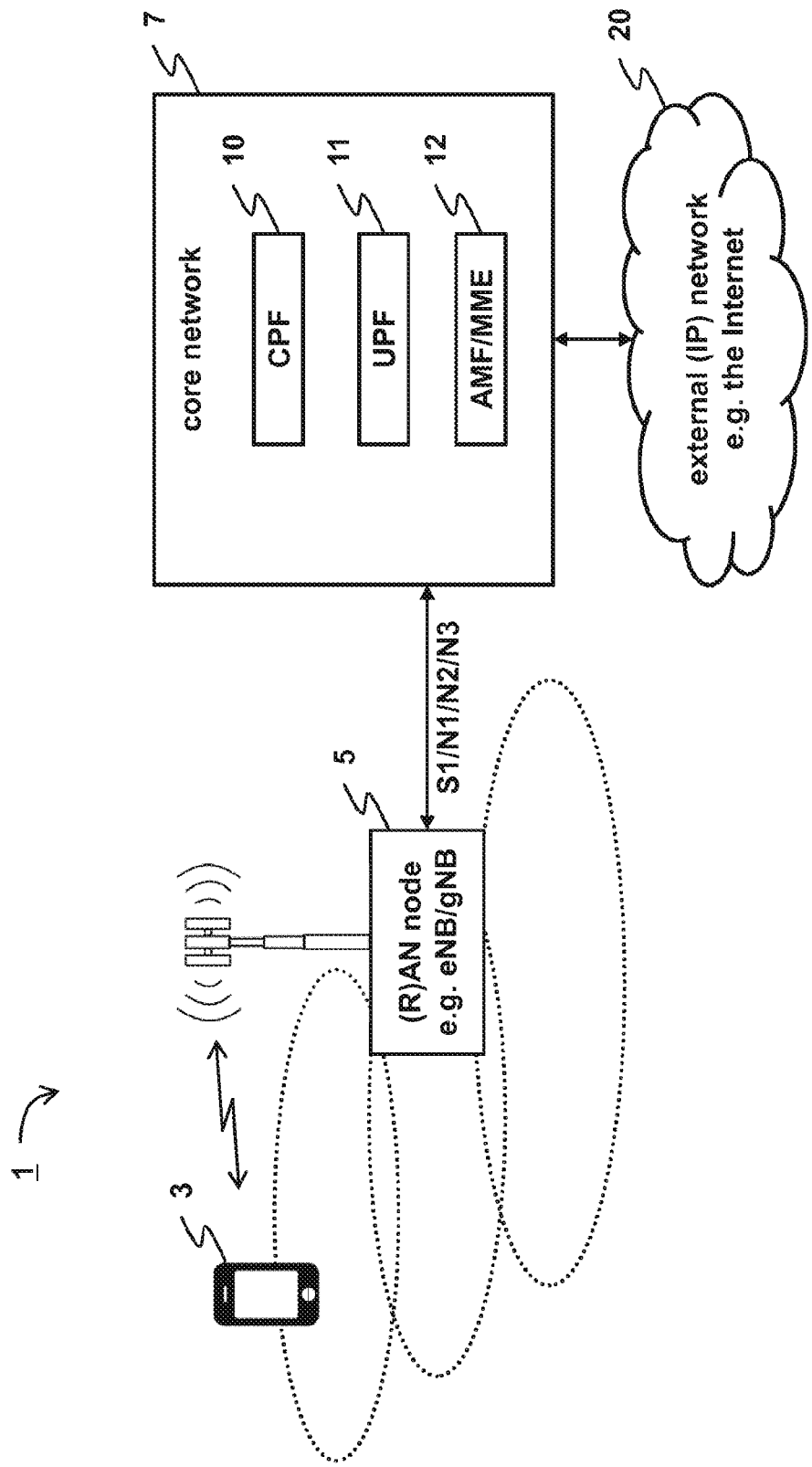
FIG. 1 schematically illustrates a mobile (cellular or wireless) telecommunication system to which the described embodiments are applicable.

More and more new services are to be deployed by 3GPP which will require differentiated treatment by the RAN or Core Network. New Service Types definitions will be needed so that the Core Network can differentiate between different services and apply differentiated treatment.

In current 3GPP mobile networks, some services, e.g. delay tolerant service or low priority services, can be distinguished by means of "subscriber information" available in the network. This would be a service type per UE i.e. service request type 'per device'.

However, that is a problem in the use cases where for example a CIoT device, that is considered as a delay tolerant by the subscriber information, wants to transmit fault reports in a delay non tolerant manner. There is no way to differentiate between these two types of communication coming from the same device in a system where the service type is distinguishable 'per device'. The opposite use case where a device, e.g. cargo tracking CIoT device that is considered not tolerant to delay, wants to transmit delay tolerant diagnostic information. Again there is no way to differentiate between these two types of communication coming from the same device.

At least one of the following exemplary embodiments proposes 'service request type per communication' i.e. differentiation between different communications coming from the same device. For this, the exemplary embodiment introduces new service types/values in the service type field of the Service Request message from the UE so that the network (e.g. AMF or MME) can differentiate a service type request 'per communication' which would allow for differentiated treatment by the network resulting in a better and an optimised network functions control.

Accordingly, embodiments of the present invention provide methods and associated apparatus that address or at least alleviate (at least some of) the above described problems.

Although for efficiency of understanding for those of skill in the art, the invention will be described in detail in the context of a 3GPP system (5G networks), embodiments of the invention can be applied to other systems as well.

In one embodiment, the invention provides a method performed by a network node, the method comprising: receiving a service request for requesting a communication for a user equipment (UE), the service request including information identifying a service type associated with the requested communication; and determining whether to reject the service request based on the service type associated with the requested communication.

In one embodiment, the invention provides a method performed by a user equipment (UE), the method comprising: sending a service request to a network node for requesting a communication, the service request including information identifying a service type associated with the requested communication; and receiving, from the network node, a message allowing or rejecting the service request based on the service type associated with the requested communication.

In one embodiment, the invention provides a method performed by a network node, the method comprising: determining whether the network node is operating in a congestion/pre-congestion state; and sending, to a node of a (radio) access network, when it is determined that the network node is operating in a congestion/pre-congestion state, a message for activating overload control, the message including information identifying at least one service type for which said overload control is applicable.

In one embodiment, the invention provides a method performed by a node of a (radio) access network, the method comprising: receiving, from a network node, a message for activating overload control, the message including information identifying at least one service type; and applying overload control for said at least one service type.

In one embodiment, the invention provides a network node comprising: means for receiving a service request for requesting a communication for a user equipment (UE), the service request including information identifying a service type associated with the requested communication; and means for determining whether to reject the service request based on the service type associated with the requested communication.

In one embodiment, the invention provides a user equipment (UE) comprising: means for sending a service request to a network node for requesting a communication, the service request including information identifying a service type associated with the requested communication; and means for receiving, from the network node, a message allowing or rejecting the service request based on the service type associated with the requested communication.

In one embodiment, the invention provides a network node comprising: means for determining whether the network node is operating in a congestion/pre-congestion state; and means for sending, to a node of a (radio) access network, when it is determined that the network node is operating in a congestion/pre-congestion state, a message for activating overload control, the message including information identifying at least one service type for which said overload control is applicable.

In one embodiment, the invention provides a node of a (radio) access network, the node comprising: means for receiving, from a network node, a message for activating overload control, the message including information identifying at least one service type; and means for applying overload control for said at least one service type.

In one embodiment, the invention provides a network node comprising a controller and a transceiver, wherein the controller is configured to: receive a service request for requesting a communication for a user equipment (UE), the service request including information identifying a service type associated with the requested communication; and determine whether to reject the service request based on the service type associated with the requested communication.

In one embodiment, the invention provides a user equipment (UE) comprising a controller and a transceiver, wherein the controller is configured to: send a service request to a network node for requesting a communication, the service request including information identifying a service type associated with the requested communication; and receive, from the network node, a message allowing or rejecting the service request based on the service type associated with the requested communication.

In one embodiment, the invention provides a network node comprising a controller and a transceiver, wherein the controller is configured to: determine whether the network node is operating in a congestion/pre-congestion state; and send, to a node of a (radio) access network, when it is determined that the network node is operating in a congestion/pre-congestion state, a message for activating overload control, the message including information identifying at least one service type for which said overload control is applicable.

In one embodiment, the invention provides a node of a (radio) access network, the node comprising a controller and a transceiver, wherein the controller is configured to: receive, from a network node, a message for activating overload control, the message including information identifying at least one service type; and apply overload control for said at least one service type.

Embodiments of the invention extend to corresponding systems, and computer program products such as computer readable storage media having instructions stored thereon which are operable to program a programmable processor to carry out a method as described in the embodiments and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

FIG. 1 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions 10 and user plane functions 11. In this example, the core network 7 includes, amongst others, an Access and Mobility Function (AMF) 12. In some networks (e.g. LTE) a Mobility Management Entity (MME) may be used instead of, or in addition to the AMF 12. From the core network 7, connection to an external IP network 20 (such as the Internet) is also provided.

The components of this system 1 are configured to perform congestion control based on a service type associated with the requested communication itself (i.e. on a 'per communication' basis) instead of, or in addition to, the service type associated with the UE requesting the communication.

In more detail, when the UE 3 (which may be a CIoT/MTC device) sends a service request for communication with another node, the UE 3 includes in the service request information identifying the service type associated with the requested communication.

The AMF/MME 12 (and/or another suitable network node) receives the service request from the UE 3 and determines, based on the service type associated with the requested communication, whether to reject the service request. For example, when the AMF/MME 12 is in a congested state or in a pre-congestion state, it may reject requests for delay tolerant services from UEs 3 that are normally associated with non-delay tolerant services (the AMF/MME 12 may also provide a back-off timer for such rejected requests). Moreover, even when the AMF/MME 12 is in a congested/pre-congestion state, it may still allow requests for non-delay tolerant services, if appropriate, even from those UEs 3 that are normally associated with delay tolerant services.

In order to perform such service type based congestion control, the AMF/MME 12 (and/or another suitable network node) may provide an indication to the base station 5 regarding which services (which types of services) shall be rejected.

User Equipment (UE)

Figure 2:
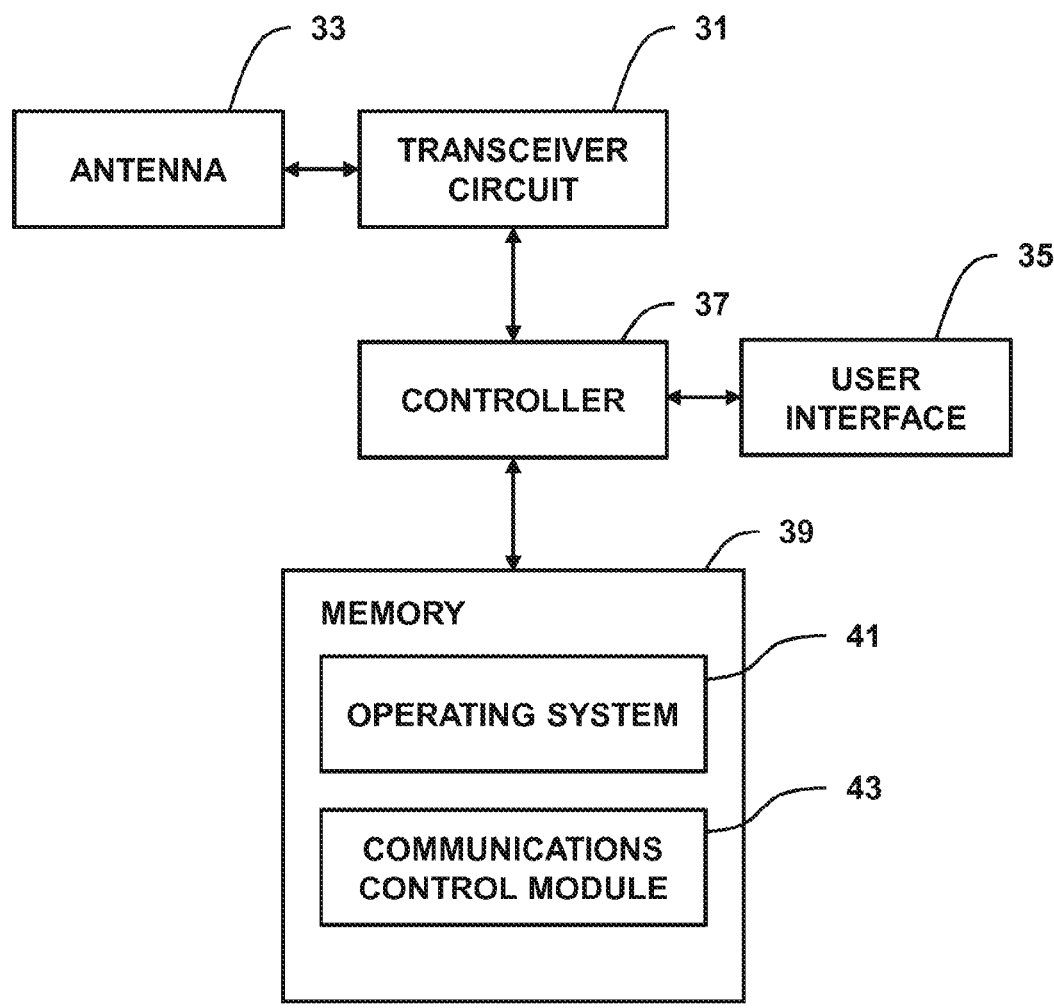
FIG. 2 is a block diagram illustrating the main components of the UE shown in FIG. 1.

FIG. 2 is a block diagram illustrating the main components of the UE (mobile device 3) shown in FIG. 1. As shown, the UE includes a transceiver circuit 31 which is operable to transmit signals to and to receive signals from the connected node(s) via one or more antenna 33. Although not necessarily shown in FIG. 2, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 3:
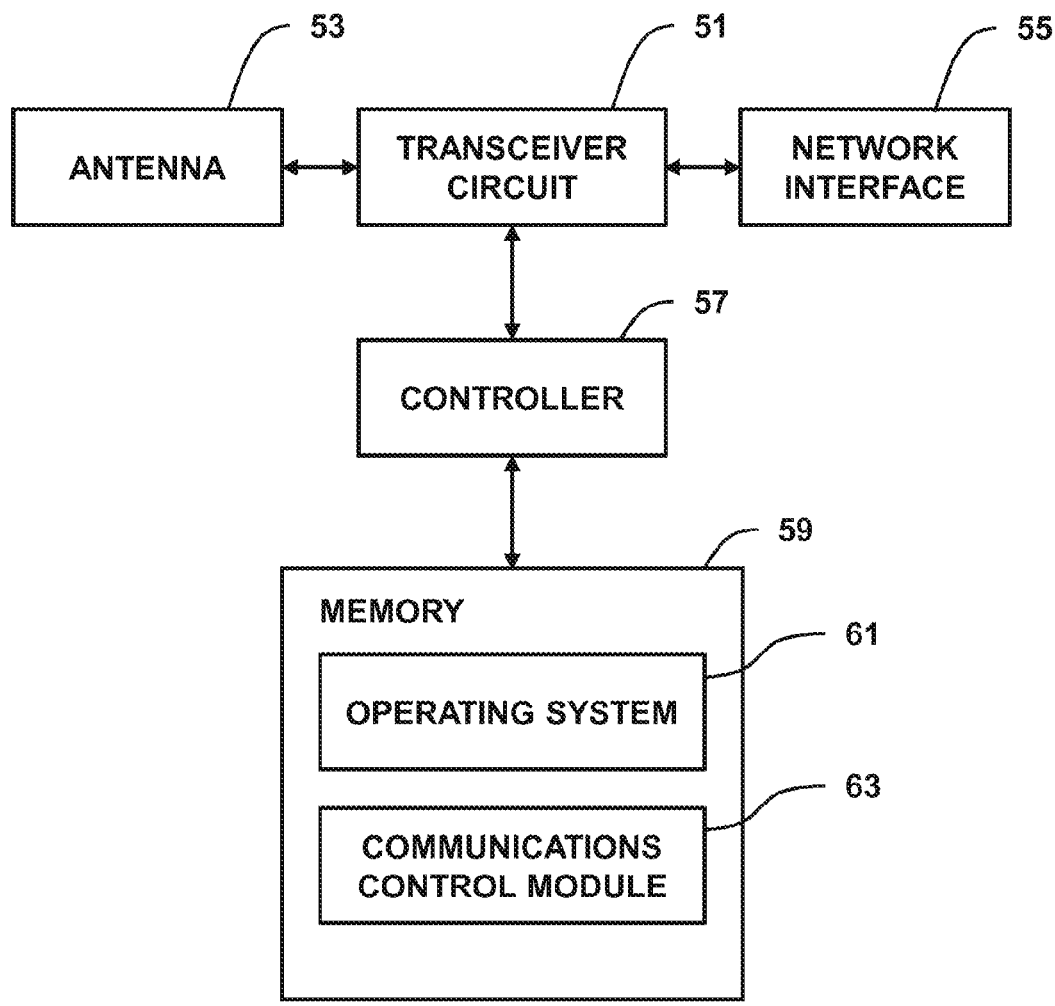
FIG. 3 is a block diagram illustrating the main components of an exemplary (R)AN node shown in FIG. 1.

FIG. 3 is a block diagram illustrating the main components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes (e.g. AMF/MME 12).

Core Network Node

Figure 4:
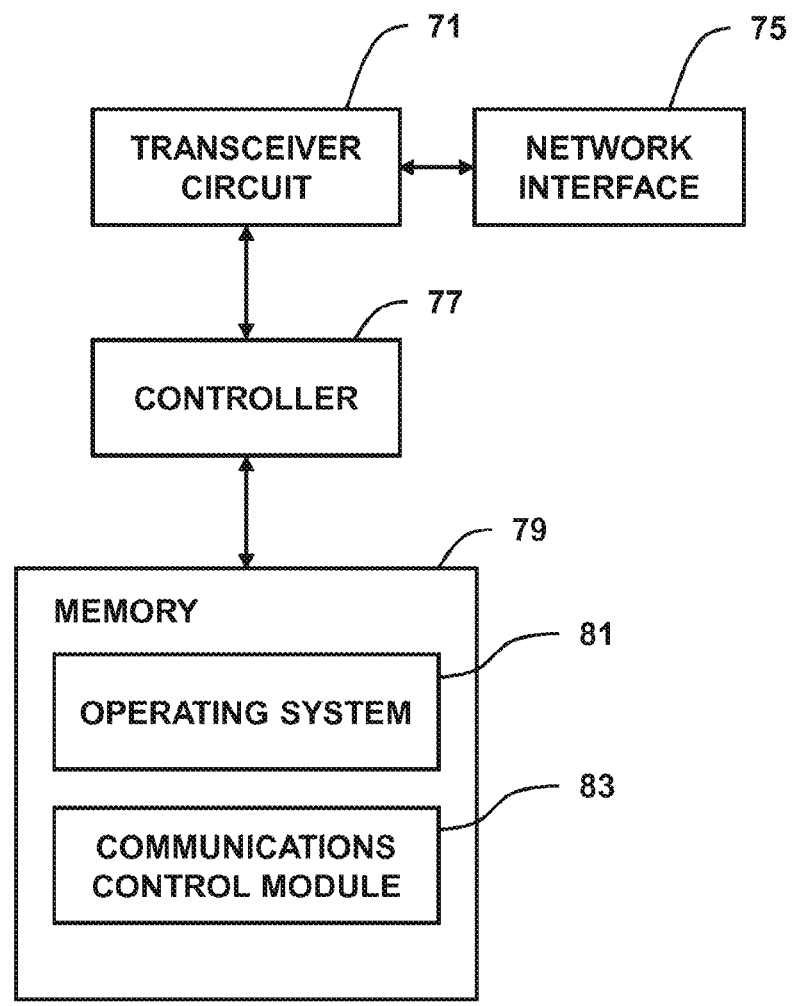
FIG. 4 is a block diagram illustrating the main components of a core network node shown in FIG. 1.

FIG. 4 is a block diagram illustrating the main components of a generic core network node (or function), for example, the AMF/MME 12 shown in FIG. 1. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to Application Function influence on traffic routing.

Embodiment 1—New Service Types and Related Back-Off Timers

An exemplary embodiment proposes to introduce new service types, see FIG. 5 which demonstrates an example for a new service type field/value introduction in the Service Type information element to specify the purpose of the Service Request procedure in 5G, TS 24.501 V1.1.1. The value for the new service request shown in FIG. 5 is an example as the new service type could take any value from the available value space for the Service Type information element. Although FIG. 5 illustrates a specific number of bits and specific value of bits for indicating a new service type, it will be appreciated that any suitable number of bits and/or any suitable value of bits may be used (at least within the 8 bits space of a given octet). Similarly, the proposed new service types could also be introduced for E-UTRAN (LTE) mobile networks and terminals in the service type information in TS 24.301 V15.2.0. The introduction of the new service types would allow for better, more sophisticated and differentiated treatment by the 3GPP mobile network for the new services to be deployed in 5G and 4G mobile networks. Several new service types are considered by this proposal.

Embodiment 1A: New Service Type=Delay Tolerant Access

In order to facilitate the deployment of the delay tolerant services by the 3GPP and non-3GPP mobile networks, it is proposed to introduce a new service type 'delay tolerant access' (or any other name or notation for the new service type with the purpose of indication that the requested service is delay tolerant or not delay sensitive, i.e. the service could be delayed, if necessary). The new service type is to be used by the UE when accessing mobile network for a delay tolerant data transmission. This would allow the network to serve the UE in best possible manner with the least impact or complications to the existing mobile network functionality and behavior.

The proposed new service type 'delay tolerant access' can bring improvements to the network congestion control. Currently, when the mobile network becomes congested, the network starts rejecting some UE triggered services (excluding for example these for emergency access, priority access or response to paging) with or without returning an appropriate back-off timer. However, the congestion control could be further improved. For example:

Scenario 1) A certain UE may serve several applications where some of the applications are delay tolerant and some are not delay tolerant. For an efficient congestion control by the mobile network it would be beneficial if the network can distinguish when the UE is coming with a request for data transfer triggered by an application that is delay tolerant and when the request from the UE is triggered by an application that is not delay tolerant. This means that the service type request by the UE is 'per communication' rather than 'per device'. This would allow the mobile network to improve and optimise the congestion control (e.g. avoid the overload) by starting first to reject (with or without back-off timer) requests by that UEs for delay tolerant service and later, if the congestion is still not eased, the mobile network may start rejecting (with or without back-off timer) the requests for not delay tolerant services, as well. To achieve this improvement in the congestion control by the mobile networks, it is required that the UE indicates in the Service Request message to the network a delay tolerant access service type when accessing the network for delay tolerant service or communication.

Scenario 2) A certain UE may serve an application which may access the network for both, delay tolerant service and delay non tolerant service. For example, a CIoT device like an utility meter may request transmission to relay the meter readings (which can be treated as delay tolerant) or sometimes to transmit fault indication which should not be treated as delay tolerant request. In this scenario again, for an efficient congestion control by the mobile network it would be beneficial if the network can distinguish when the UE is coming with a request for a data transmission that is delay tolerant and when the UE is coming with request for data transmission that is not delay tolerant (e.g. from the same application). This means the service type request by the UE is 'per communication' rather than 'per application'. This would again allow the mobile network to improve and optimise the congestion control (e.g. avoid the overload) by starting first to reject (with or without back-off timer) requests by that UE for delay tolerant service and later, if the congestion is still not eased, the mobile network can start rejecting (with or without back-off timer) the request for delay non tolerant service, as well. To achieve this improvement in the congestion control by the mobile network it is required that the UE indicates in the Service Request message to the network a delay tolerant access service type when accessing the network for delay tolerant service or communication.

Figure 6:
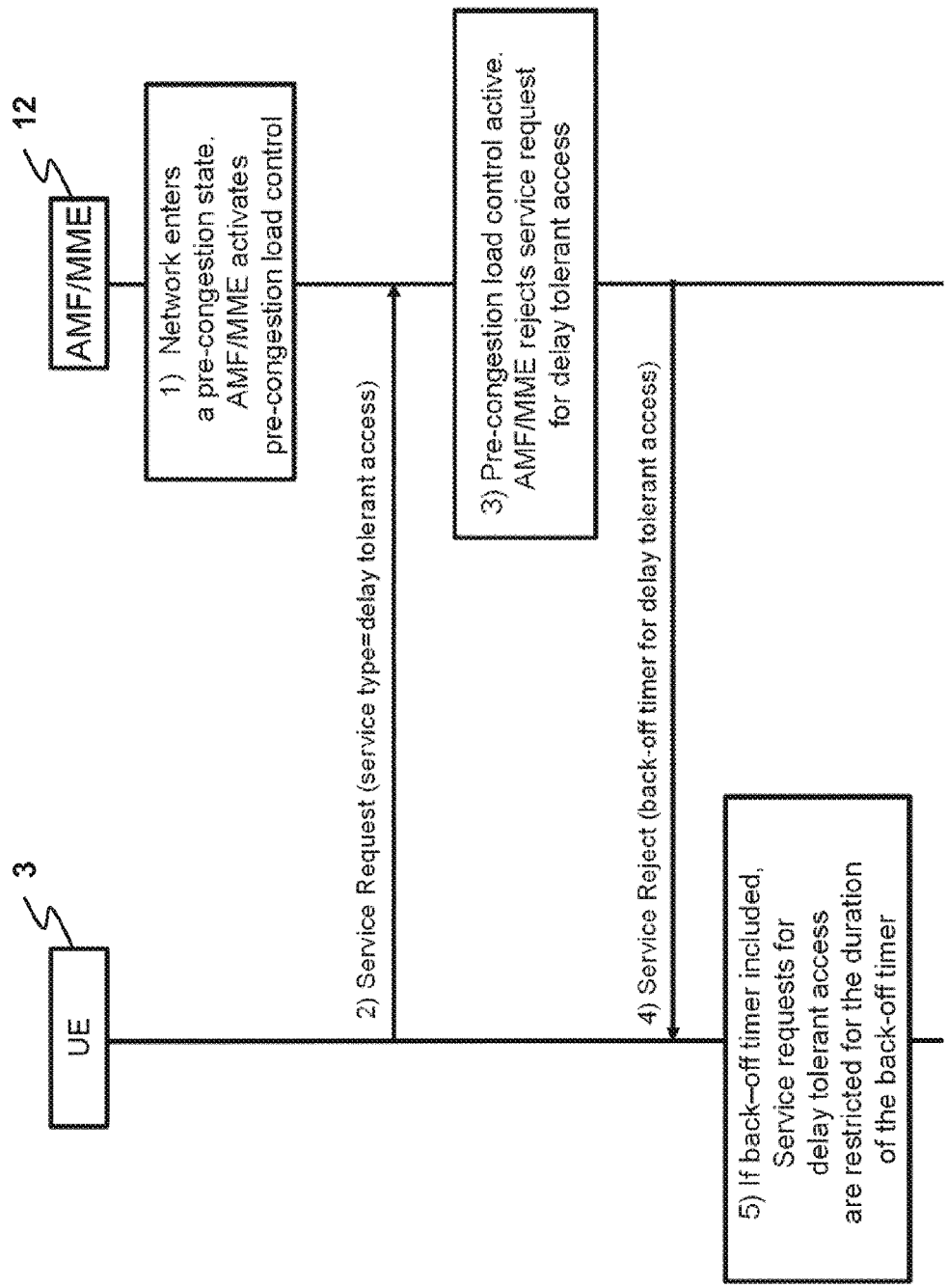
FIGS. 6 to 10 are schematic signalling (timing) diagrams illustrating exemplary procedures in accordance with some exemplary embodiments of the present invention.

FIG. 6 illustrates schematically an exemplary procedure for using the newly proposed 'delay tolerant access' service type in 'per communication' manner. The procedure includes the following steps:

1) The mobile network (e.g. AMF or MME) enters a pre-congestion state (based on operator configured congestion thresholds or operator policy, for example) and the network activates a pre-congestion load control, for example rejection for delay tolerant access types service requests.
2) A certain application in the UE requests service for delay tolerant data. The UE triggers Service Request procedure with service type set to 'delay tolerant access' (and/or the like).
3) As the mobile network is in pre-congestion state, the AMF or MME has already activated a congestion control for delay tolerant services. The AMF or MME rejects the Service Request from the UE. Here, the Service Request message may be a message to request the establishment of an N1 NAS signalling connection and/or a message to request the establishment of user-plane resources for PDU sessions which are activated without user-plane resources. The Service Request message may include at least one of information elements (extended protocol discriminator, security header type, spare half octet, 5G-S-TMSI, Uplink data status, PDU session status, Allowed PDU session status) other than the Service type.
4) The AMF or MME returns Service Reject message to the UE and the AMF or MME may include a back-off timer within the Service Reject message. The back-off timer could be a designated delay tolerant back-off timer (or any other name or notation for a back-off timer with the purpose of restricting services access for delay tolerant type of service access by the UE) or a legacy back-off timer e.g. a control plane back-off timer or any other legacy back-off timer which if returned during service request procedure for delay tolerant access, would implicitly restrict any further request for delay tolerant access from that UE. Here, the Service Reject message may be a message to reject the service request procedure. The Service Reject message may include at least one information element (e.g. Extended protocol discriminator, Security header type, Spare half octet, Service reject message identity, 5GMM cause, PDU session status, T3346 value, EAP message) other than the back-off timer.

5) If a delay tolerant back-off timer is included in the Service Reject message (explicitly or implicitly), the UE shall start the delay tolerant back-off timer and the UE shall not trigger another Service Request for delay tolerant access type communication for the duration of the delay tolerant back-off timer. The delay tolerant back-off timer shall continue running if UE moves to another cell or RAT. The delay tolerant back-off timer shall:
   be stopped after successful service area change (registration or TAU with AMF/MME change);
   be stopped when a new PLMN is accessed;
   allow for sending and receiving of SMS services.

Figure 7:
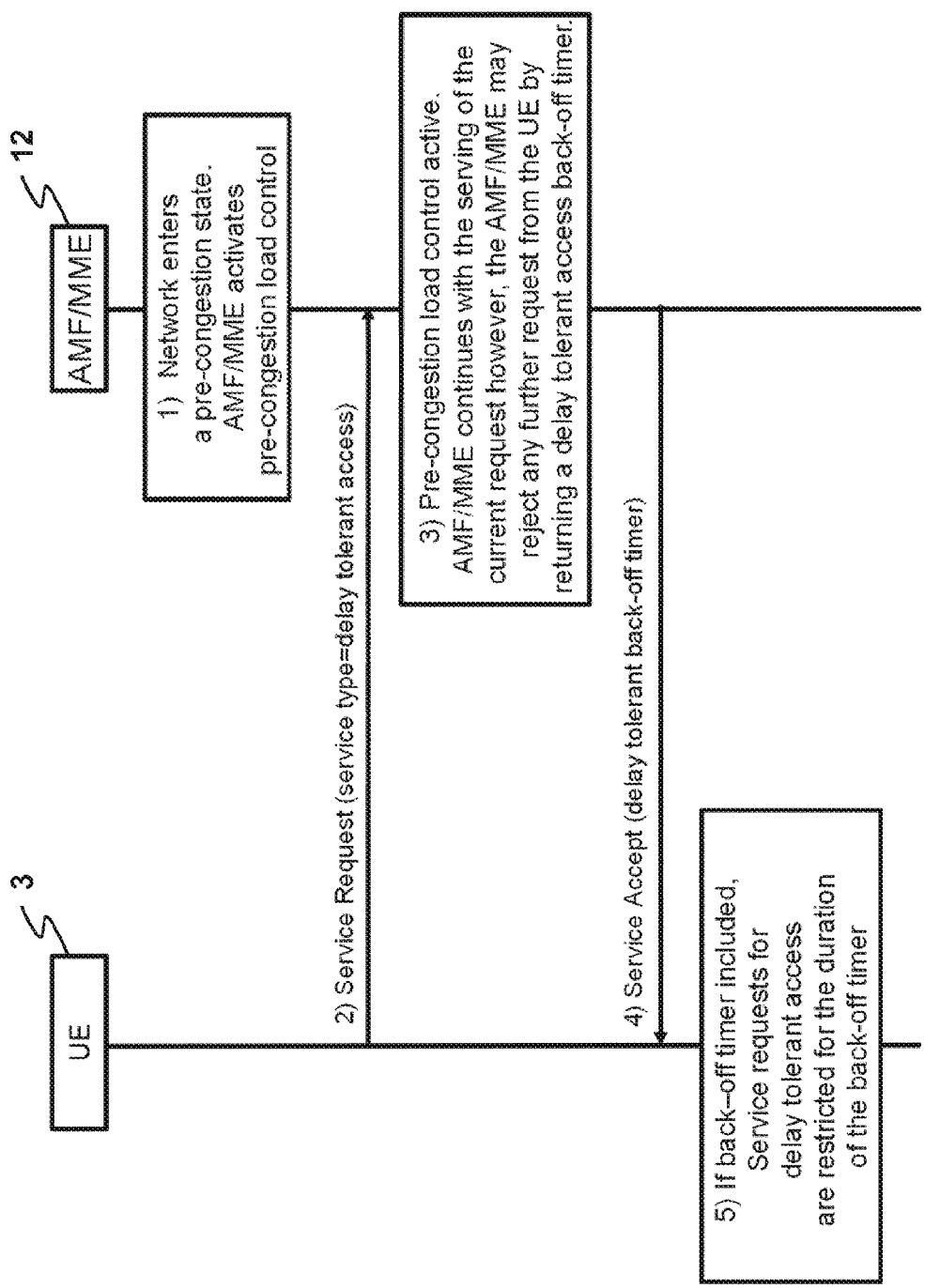

In another implementation the back-off timer for delay tolerant access service could be returned to the UE within the Service Accept message, see FIG. 7. Specifically, FIG. 7 illustrates schematically an exemplary procedure for delay tolerant service access rejection comprising the following steps:

1) The mobile network (e.g. AMF or MME) enters a pre-congestion state (based on operator configured congestion thresholds or operator policy, for example) and the network activates a pre-congestion load control, for example rejection for delay tolerant access types service requests.
2) A certain application in the UE requests service for delay tolerant data. The UE triggers Service Request with service type=delay tolerant access.
3) As the mobile network is in pre-congestion state, the AMF/MME has already activated a congestion control for delay tolerant services. The AMF/MME continues with the serving of the current request however, the AMF/MME may decide to reject any further request for delay tolerant access by that UE by returning a back-off timer for delay tolerant access.
4) The AMF/MME returns Service Accept message to the UE and the AMF/MME includes a back-off timer within the Service Accept message. The back-off timer could a be a designated delay tolerant back-off timer (or any other name or notation for a back-off timer for the purpose of restricting services access for delay tolerant type of service access by the UE) or a legacy back-off timer e.g. a control plane back-off timer or any other legacy back-off timer which if returned during service request for delay tolerant access procedure would implicitly restrict any further request for delay tolerant access from that UE. Here, the Service Accept message may be a message to accept the service request procedure. The Service Accept message may include at least one information element (e.g. Extended protocol discriminator, Security header type, Spare half octet, Service accept message identity, PDU session status, PDU session reactivation result, PDU session reactivation result error cause, EAP message) other than the back-off timer.
5) If a back-off timer for delay tolerant access (explicitly or implicitly) is included in the Service Accept message, the UE shall start the delay tolerant back-off timer and the UE shall not trigger another Service Request for delay tolerant access type communication for the duration of the back-off timer. The delay tolerant back-off timer shall continue running if UE moves to another cell or RAT. The delay tolerant back-off timer shall:
   be stopped after successful service area change (registration or TAU with AMF/MME change);
   be stopped when a new PLMN is accessed;
   allow for sending and receiving of SMS services Embodiment 1B: New Service Type='Low Priority Access' or 'Background Data Access'

Another example for a new service access type for the Service Request procedure in 5G and 4G is 'low priority data access or 'background data access' (or any other name or notation for a service access type for the purpose of identification of a service access request for data that is of low priority. For example, the data collection and reporting by the UE for the purpose of the NWDA (Network Data Analytics) in the network or any other request for data that is of low priority by configuration or by operator's policy in the core network. This could include the request for data access by delay tolerant applications or UE's, as well.

Both, the 'low priority access' and the 'background data access' service request types could be beneficial for the congestion control in the core network the same way as with the 'delay tolerant access' service type described in Embodiment 1A. FIG. 6 and FIG. 7 from Embodiment 1A are equally applicable to Embodiment 1B.

When in step 2 in FIG. 6 or FIG. 7 the service type is set to 'low priority access', the network may return in step 4 of FIG. 6 or FIG. 7 a back-off timer. The back-off timer may be a designated 'low priority back-off timer' (or any other name or notation for a back-off timer with the purpose of restricting services access for low priority type of service access by the UE) or a legacy back-off timer e.g. a control plane back-off timer or any other legacy back-off timer which if returned during a service request procedure for low priority access, would implicitly restrict any further request for low priority access from that UE.

When in step 2 in FIG. 6 or FIG. 7 the service type is 'background data access', the network may return in step 4 of FIG. 6 or FIG. 7 a back-off timer. The back-off timer could be a designated 'background data back-off timer' (or any other name or notation for a back-off timer with the purpose of restricting services access for background data type of service access by the UE) or a legacy back-off timer e.g. a control plane back-off timer or any other legacy back-off timer which if returned during service request procedure for background access, would implicitly restrict any further request for low priority access from that UE.

Embodiment 2—Core Network Overload Indication for the New Service Types

Exemplary embodiment 2 proposes that when the Core Network (e.g. AMF or MME) enters a pre-congestion state the Core Network may activate a congestion control for one or more of the new service access types proposed in the embodiment 1 i.e. delay tolerant access or/and low priority access or/and background data access in order to restrict the load that the 5G or 4G Access Nodes are generating. This congestion control is called N2 overload control in 5G and S1 overload control in 4G. In this case the Core Network (e.g. AMF or MME) may send N2 overload control message in 5G or Overload Start message in 4G to the RAN (e.g. gNB or eNB) with one or combination of the following indications:

a 'delay tolerant data access' parameter (or any other name or notation for the purpose of restricting the requests from the UEs for delay tolerant data type communication at RAN level); OR a 'low priority data access' parameter (or any other name or notation for the purpose of restricting the requests from the UEs for low priority type data communication at RAN level); OR a 'background data access' parameter (or any other name or notation for the purpose of restricting the requests from the UEs for background data type communication at RAN level).

Figure 8:
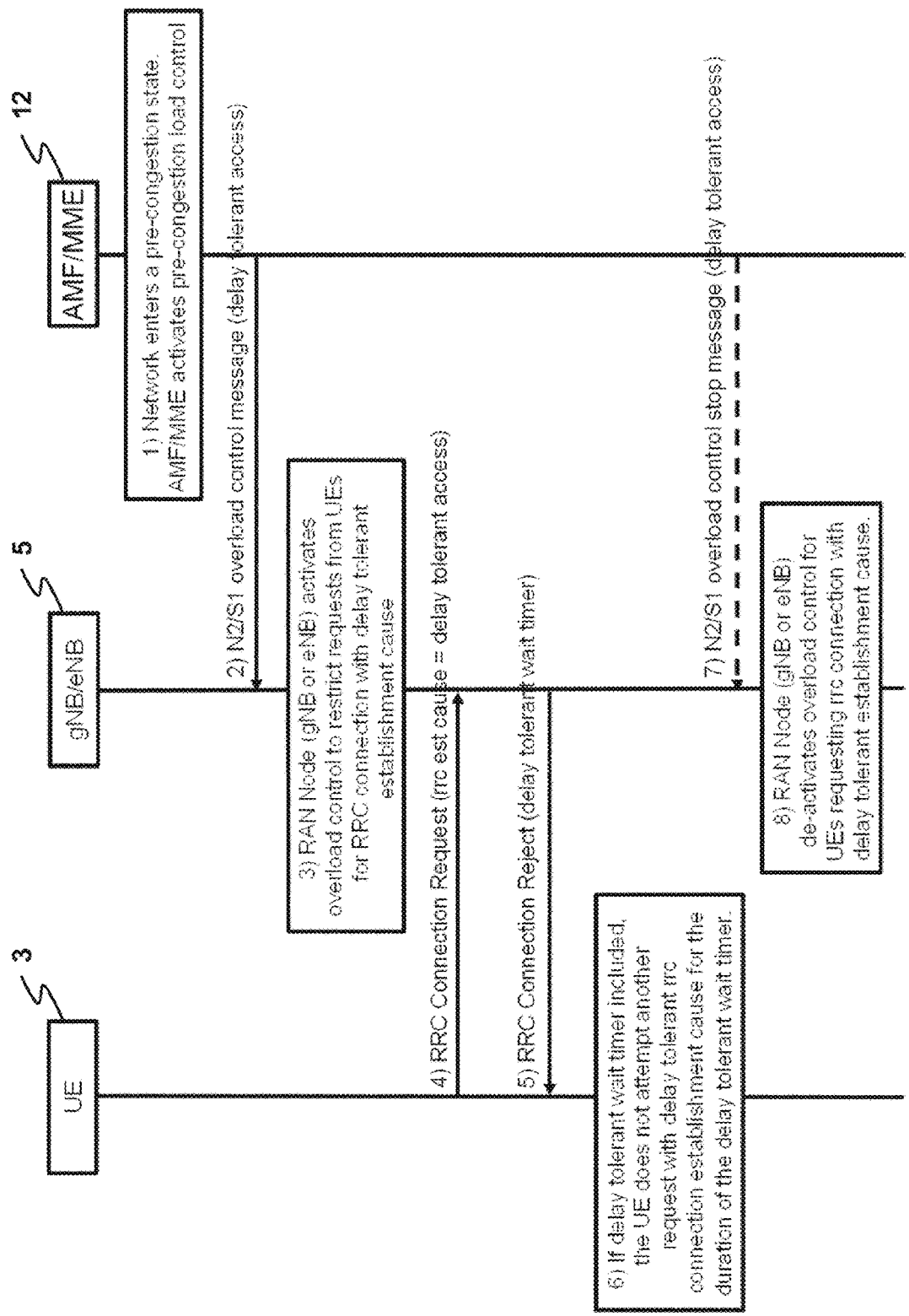

Embodiment 2 is demonstrated in FIG. 8, which illustrates schematically an exemplary procedure for N2/S1 overload control.

Embodiment 2A: Overload for 'Delay Tolerant Access' Indication by the AMF/MME

1) The network (e.g. AMF or MME) enters a pre-congestion state. The network (e.g. AMF or MME) activates load control for delay tolerant access type of communication.
2) The network (e.g. AMF or MME) indicates the start of the overload control by sending N2 overload control message to the gNB in 5G or S1 Overload Start message to the eNB in 4G with a parameter indicating overload for delay tolerant access. The network may also include the percentage value of the overload.
3) The RAN Node (e.g. gNB or eNB) activates an overload control for delay tolerant access. The RAN Node shall reject requests from UEs for delay tolerant access type, i.e. reject requests from UEs for connection establishment with delay tolerant RRC establishment cause.
4) UE requests RRC connection establishment with delay tolerant RRC establishment cause, for example.
5) As the RAN node has activated overload control for delay tolerant type communication or services, the RAN Node shall reject the requests for RRC connection establishment with delay tolerant RRC establishment cause. The RAN node may include in the RRC Connection Reject message a delay tolerant wait timer. The delay tolerant wait timer can be indicated in the RRC Reject message explicitly by including a designated 'delay tolerant wait timer' or implicitly by including a legacy wait timer which if returned within RRC Connection Reject message as an answer to a request for delay tolerant access, would implicitly restrict any further request for delay tolerant access from that UE.
6) If delay tolerant timer is included (implicitly or explicitly) in the RRC Connection Reject message, the UE shall start the delay tolerant timer in the UE and the UE shall not initiate another request for RRC connection with delay tolerant RRC establishment cause for the duration of the delay tolerant wait timer.
7) When the network decide to stop the overload control for delay tolerant access, the network (e.g. AMF or MME) may send N2 overload control stop message in 5G or S1 Overload Stop message in 4G with indication for delay tolerant access.
8) At receiving N2 overload control stop by the AMF or Overload Stop Message by the MME with indication of delay tolerant access, the RAN Node shall stop the overload control for delay tolerant access in the RAN node.

Embodiment 2B: Overload for 'Low Priority Access' or 'Background Data Access' Indication by the AMF/MME More examples for a new type of overload indication from the AMF or MME to the RAN node are 'low priority access' and 'background data access' indications within the N2 overload control message from the AMF or S1 Overload Start message from the MME.

The 'low priority access' indication from the AMF or MME is for the purpose of restricting requests from UEs for connection establishment for low priority service.

The 'background data access' indication from the AMF or MME is for the purpose of restricting requests from UEs for connection establishment for background data service.

FIG. 8 from Embodiment 2A is equally applicable to Embodiment 2B.

Requests from the UE for low priority access or background access are rejected with the RRC Connection Reject message (which may include low priority wait timer or background data wait timer) if the request is via RRC Connection Establishment Request message or already established RRC connections are released if the request is via RRC Connection Setup Complete message (which again may include low priority wait timer or background data wait timer).

Embodiment 3

Figure 9:
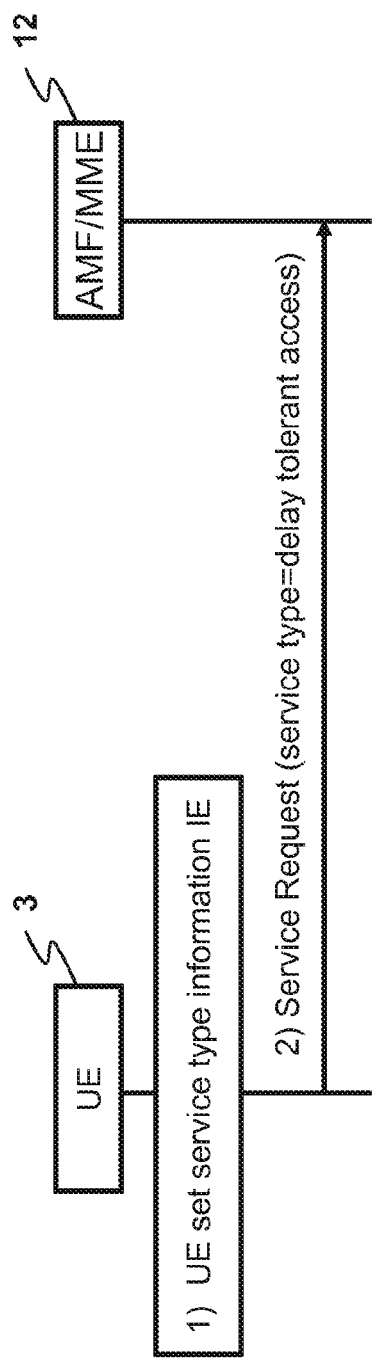

FIG. 9 discloses an exemplary embodiment which represents a part of the overall service request procedure.
1) When a certain application in the UE requests a service for delay tolerant data, the UE sets a service type information element (IE) in a service request message to (a suitable value which indicates) delay tolerant data.
2) The UE sends, to the AMF/MME, the service request message including the service type IE set to 'delay tolerant data'.

According to this exemplary embodiment, the UE can inform the AMF/MME of the new purpose of the service request procedure.

Embodiment 4

Figure 10:
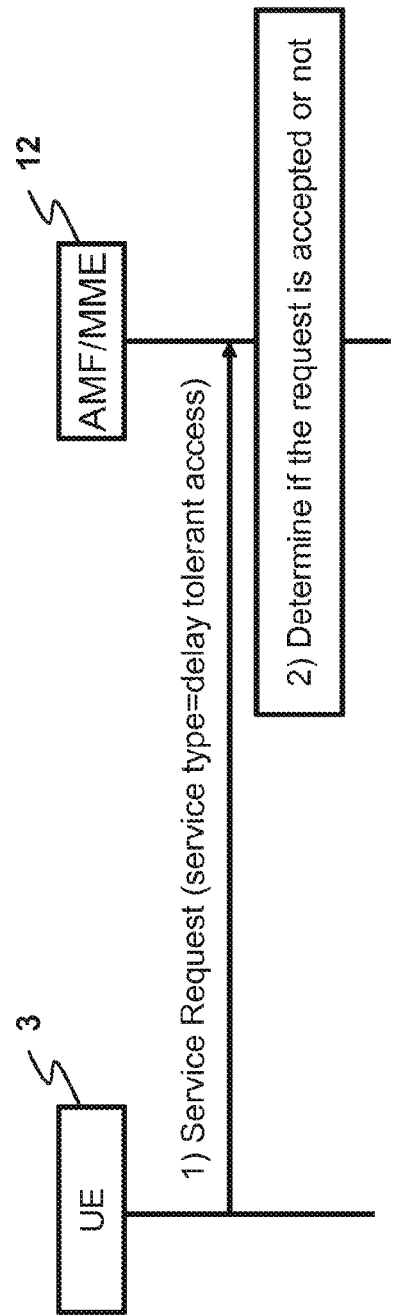

FIG. 10 discloses an exemplary embodiment which represents a part of the overall service request procedure.
1) The AMF or MME receives a service request message including a service type IE set to (a suitable value which indicates) delay tolerant data.
2) The AMF or MME determines if the request related to the service request message can be accepted or not.

According to this exemplary embodiment, the AMF/MME can use the received new service type IE to determine if the service request is accepted or not.

Beneficially, the above described exemplary embodiments include, although they are not limited to, one or more of the following functionalities:

Embodiment 1

1) New service access type 'delay tolerant access', 'low priority access' and 'background data access' indicated by the UE in the Service Request procedure.
2) New service types 'delay tolerant access', 'low priority access', 'background data access' used for 'per communication' access from the same UE or same application.

3) Pre-congestion control in the core network for 'delay tolerant access', or 'low priority access' or 'background data access' service types, separately or in any combination.
4) New type of back-off timers—delay tolerant back-off timer, low priority back-off timer and background data back-off timer.
5) A UE that was returned a back off timer for delay tolerant access or low priority access or background data access shall restrict request for the related access while the related access type back-off timer is running.

Embodiment 2

1) Overload start indication for delay tolerant access or low priority access or background data access from the AMF/MME to the RAN node.
2) Delay tolerant wait timer, or low priority wait timer or background data wait timer in the RRC Connection Reject message from the RAN node to the UE.
3) A UE that was returned a wait timer for delay tolerant access or low priority access or background data access shall restrict request for the related access while the related access type back-off timer is running.

Embodiment 1 describes an exemplary method in which:
1) The core network may enter a pre-congestion state and it may activate service restriction for 'delay tolerant access' service type requests or 'low priority access' service type requests or 'background data access' service type requests or for any combination of the them.
2) A UE may requests service access for 'delay tolerant access', 'low priority access' or 'background data access' with 'per communication' granularity (i.e. per communication granularity access from the same UE or application in the UE).
3) If the network is in pre-congested state, the network may activate a congestion control for one or more access types or combination of them, i.e. 'delay tolerant access', or/and 'low priority access' or/and 'background data access'
4) The network may reject requests for 'data tolerant access' and/or 'low priority access' and/or 'background data access' and the network may return a related back-off timer (implicitly or explicitly), e.g. delay tolerant back-off timer, low priority back-off timer or background data back-off timer.
5) A UE that was returned a back off timer for delay tolerant access or low priority access or background data access shall restrict request for the related access while the related access type back-off timer is running.

Embodiment 2 describes an exemplary method in which:
1) The core network may enter a pre-congestion state and it may send N2 overload control message to the RAN node with indication for delay tolerant access, low priority access or background data access.
2) RAN node rejects requests for RRC connection establishment from the UE for the type of access indicated in the N2 overload control message from the AMF or in the Overload Start Message from the MME.
3) The RAN node may indicate delay tolerant wait timer or low priority wait timer or background data wait timer in the RRC Reject message to the UE.
4) A UE that was returned a wait timer for delay tolerant access or low priority access or background data access shall restrict request for the related access while the related access type wait timer is running.

According to at least one of the above described embodiments, the new service types can allow for 'per communication' service type granularity which results in better and optimised congestion control in the mobile networks.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

The method performed by the network node may further comprise sending a service reject message to the UE when it is determined that the service request is to be rejected based on the service type associated with the requested communication. The method may further comprise sending, to the UE, information identifying a back-off timer for the service type associated with the requested communication. The information identifying a back-off timer may be included in a service accept message or in said service reject message.

The determining, by the network node, whether to reject the service request may be based on whether or not the network node is in a congestion/pre-congestion state.

The service type associated with the requested communication may indicate at least one of: a service type different to a service type associated with the UE; a delay tolerant service; a non-delay tolerant service; a low priority service; and background data access.

The UE may comprise a Cellular Internet of Things (CIoT) UE and/or a Machine Type Communication (MTC) UE. The network node may comprise at least one of: an Access and Mobility Function (AMF); a Mobility Management Entity (MME); and a base station. When the network comprises a base station, the method may further comprise obtaining, from another network node, information identifying a congestion/pre-congestion state for at least one service type.

The information sent by the network node to the node of a (radio) access network may identify at least one of: delay tolerant services; non-delay tolerant services; low priority services; and background data access.

The method performed by a node of a (radio) access network may further comprise: receiving a service request for requesting a communication for a user equipment (UE), the service request including information identifying a service type associated with the requested communication; and determining whether to reject the service request based on the service type associated with the requested communication and the information included in the message for activating overload control.

Various other modifications will be apparent to those skilled in the art and will not be described in further detail here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] TS 23.501 V15.0.0
[2] TS 23.502 V15.0.0
[3] TS 24.501 V1.1.1

ABBREVIATIONS AND TERMINOLOGY

3GPP 3rd Generation Partnership Project
5G-RAN 5G Radio Access Network
5G-CN 5G Core Network
5GS 5G System
AMF Access and Mobility Management Function
AS Access Stratum
CIoT Cellular Internet of Things
eNB evolved NodeB
E-UTRAN Evolved Universal Terrestrial Radio Access Network
gNB Next Generation NodeB
IoT Internet of Things
LTE Long Term Evolution (of E-UTRAN)
MIoT Massive Internet of Things
MME Mobility Management Entity
MTC Machine Type Communication
NAS Non Access Stratum
NWDA Network Data Analytics
NWDAF Network Data Analytics Function
RAN Radio Access Network
RRC Radio Resource Control
UE User Equipment

The invention claimed is:

1. A method performed by a network node, the method comprising:
    receiving a service request for requesting a communication for a user equipment (UE), the service request including information indicating whether a non-emergency service type associated with the communication is delay tolerant; and
    determining to reject the service request while keeping a connection towards the UE, in a case that the information indicates that the non-emergency service type is delay tolerant.

2. The method according to claim 1, further comprising sending a service reject message to the UE as a result of the determining.

3. The method according to claim 1, further comprising sending, to the UE, information identifying a back-off timer for the non-emergency service type.

4. The method according to claim 3, wherein the information identifying the back-off timer is included in a service accept message or in a service reject message.

5. The method according to claim 1, wherein the determining is performed in a case that the information indicates that the non-emergency service type is delay tolerant and the network node is in a congestion/pre-congestion state.

6. The method according to claim 1, wherein the non-emergency service type indicates at least one of:
    a service type different from a service type associated with the UE;
    a delay tolerant service;
    a non-delay tolerant service;
    a low priority service; and
    background data access.

7. The method according to claim 1, wherein the network node includes at least one of:
    an Access and Mobility Function; and
    a Mobility Management Entity.

8. The method according to claim 1, wherein
    the network node includes a base station, and
    the method further comprises obtaining, from another network node, information identifying a congestion/pre-congestion state for the non-emergency service type.

9. The method according to claim 1, further comprising:
    determining whether the network node is operating in a congestion/pre-congestion state; and
    sending, to a node of a (radio) access network a message for activating overload control in a case that the information indicates that the non-emergency service type is delay tolerant and the network node is in a congestion/ pre-congestion state, the message including information identifying the non-emergency service type for which the overload control is applicable.

10. The method according to claim 9, wherein the information identifies that the non-emergency service type is at least one of:
a service type different from a service type associated with the UE;
delay tolerant services;
a non-delay tolerant service;
low priority services; and
background data access.

11. The method according to claim 1, wherein the information that indicates that the non-emergency service type is delay tolerant is read from a service type field of the service request from the UE.

12. The method according to claim 1, further comprising receiving a further service request for requesting a further communication with the same UE, the further service request including information indicating whether a further non-emergency service type associated with the further communication is delay tolerant, wherein the service request indicates that the service type is delay tolerant, and the further service request indicates that the further service type is not delay tolerant.

13. The method according to claim 12, wherein the UE remains connected with the network node after sending the service request, until sending the further service request and after sending the further service request.

14. The method according to claim 1, further comprising, after the determining to reject the service request, receiving a further service request for requesting a further communication with a different UE, reading information indicating whether the further service type is delay tolerant from the further service request, and determining whether to reject the further service request based on the information in the further service request.

15. The method according to claim 1, wherein the non-emergency service type is related to a non access stratum (NAS) message.

16. A method performed by a user equipment (UE), the method comprising:
transmitting a service request to a network node for requesting a communication, the service request including information indicating whether a non-emergency service type associated with the communication is delay tolerant; and
receiving, from the network node, a message rejecting the service request while keeping a connection towards a network including the network node in a case that the information indicates that the non-emergency service type is delay tolerant.

17. The method according to claim 16, wherein the UE includes a Cellular Internet of Things (CIoT) UE and/or a Machine Type Communication (MTC) UE.

18. The method according to claim 16, wherein the UE writes the information indicating whether the service type is delay tolerant in a service type field of the service request.

19. A method performed by a node of a (radio) access network, the method comprising:
receiving, from a network node, a message for activating overload control, the message including information identifying at least one non-emergency service type and whether the at least one service type is delay tolerant; and
applying overload control for the non-emergency service type while keeping a connection towards a user equipment (UE) in a case that the information indicates that the non-emergency service type is delay tolerant.

20. The method according to claim 19, wherein
the applying overload control is further based on whether or not the network node is in a congestion/pre-congestion state, and
wherein the overload control is applied in a case that the information indicates that the non-emergency service type is delay tolerant and the network node is in the congestion/pre-congestion state.

21. A network node comprising:
a transceiver; and
a controller configured to provide for execution of the method according to claim 1.

22. A user equipment (UE) comprising:
a transceiver; and
a controller configured to provide for execution of the method according to claim 16.

23. A node of a (radio) access network, the node comprising:
a transceiver; and
a controller configured to provide for execution of the method according to claim 19.

* * * * *